United States Patent
Lee et al.

(10) Patent No.: US 6,504,816 B1
(45) Date of Patent: Jan. 7, 2003

(54) BASEBAND SIGNAL DEMODULATING APPARATUS AND METHOD IN MOBILE RADIO COMMUNICATION SYSTEM

(75) Inventors: Sang Woo Lee, Seoul (KR); Jong Youn Kim, Kyungki-do (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/215,217

(22) Filed: Dec. 18, 1998

(30) Foreign Application Priority Data

Dec. 19, 1997 (KR) ............................................. 97-70598

(51) Int. Cl.$^7$ ................................................ H04L 5/04
(52) U.S. Cl. ........................ 370/204; 370/208; 370/342; 370/441; 375/148
(58) Field of Search .................................. 370/204, 208, 370/215, 320, 335, 342, 347, 441; 375/136, 144, 148

(56) References Cited

U.S. PATENT DOCUMENTS

| | | | |
|---|---|---|---|
| 5,654,979 A | | 8/1997 | Levin et al. ................ 375/206 |
| 5,710,768 A | | 1/1998 | Ziv et al. .................... 370/342 |
| 5,940,384 A | * | 8/1999 | Carney et al. ............... 370/347 |
| 6,005,855 A | * | 12/1999 | Zehavi et al. ................ 370/335 |
| 6,167,099 A | * | 12/2000 | Rader et al. ................. 375/347 |
| 6,173,005 B1 | * | 1/2001 | Kotzin et al. ................ 375/141 |
| 6,259,683 B1 | * | 7/2001 | Sekine et al. ................ 370/328 |
| 6,269,075 B1 | * | 7/2001 | Tran ............................ 370/206 |
| 6,327,534 B1 | * | 12/2001 | Levanon et al. ....... 342/357.06 |
| 6,330,271 B1 | * | 12/2001 | Klang et al. ................. 375/130 |

* cited by examiner

Primary Examiner—Hassan Kizou
Assistant Examiner—Tim Spafford
(74) Attorney, Agent, or Firm—Fleshner & Kim, LLP

(57) ABSTRACT

A baseband signal demodulating apparatus in a mobile radio communication system capable of solving the channel increase problem due to the increase of subscribers by sharing correlators and accumulators used in a base station receiver by a time division multiplexing method. The apparatus includes a plurality of front end rake receivers for demodulating oversampled baseband signals to restore the original signal, buses for sharing demodulated signals from the front end rake receivers by the time division multiplexing method, and a despreding section for despreding the signals from the buses.

30 Claims, 2 Drawing Sheets

BASEBAND SIGNAL DEMODULATING APPARATUS AND METHOD IN MOBILE RADIO COMMUNICATION SYSTEM

BACKGROUND OF THE INVENTION

1. Field of the Invention

The present invention relates to a base station receiving system in a mobile radio communication system. In particular, the present invention relates to a baseband signal demodulating apparatus and method in a code division multiple access (CDMA) type mobile radio communication system which can share a CDMA signal processor by a time division multiplexing method by constructing the processor for processing input multichannel signals with the minimum number of elements.

2. Description of the Related Art

Generally, in processing a transmitted/received signal in a base station transmitting/receiving system of a mobile radio communication system, its frequency band may be divided into a baseband, an intermediate frequency band, and a radio frequency band. The baseband is a frequency band occupied by the original information signal which is not modulated. Accordingly, the baseband is a low frequency band which is nearly zero or which includes a direct current (DC) component. The intermediate frequency band is a frequency band wherein the baseband frequency to be transmitted to the outside is heightened by adding thereto a local oscillating frequency, while the radio frequency received from the outside is lowered by subtracting therefrom the local oscillating frequency, by means of a frequency converter provided in the base station. The radio frequency band is a frequency band which is used for radio communications, and generally means the frequencies in the electromagnetic spectrum range of 10 KHz~300 GHz.

Generally, in the CDMA type mobile radio communication system, the respective base station transmitting/receiving system includes a CDMA baseband demodulating apparatus which demodulates a CDMA baseband signal transmitted from a mobile unit to a radio frequency (RF) signal to transmit the radio frequency signal.

Such a CDMA baseband demodulating apparatus is disclosed in U.S. Pat. No. 5,654,979 issued to Levin. According to U.S. Pat. No. 5,654,979, the conventional CDMA baseband demodulating apparatus includes an analog-to-digital (A/D) converter for converting an input analog RF signal into a digital signal and repeatedly oversampling the digital signal for a predetermined period, a plurality of rake receivers for processing multipath signals outputted through the A/D converter to produce a single signal and producing an early signal and a late signal, which are respectively earlier and later than an on-time signal, based on the on-time signal determined by selecting one among the oversampled signals that is synchronized with transmitted PN sequence most superior intensity, a plurality of correlators for obtaining correlation values of the on-time signal, early signal, and late signal outputted from the front end of rake receivers in accordance with pseudo-noise codes generated by a pseudo-noise code generator, and an accumulator for accumulating output signals of the correlators.

According to the conventional CDMA baseband demodulating apparatus as described above, baseband signal from analog receiver which converts analog RF signal into a digital baseband signal is oversampled 8 times per 1 PN sequence, called "chip" in the A/D convertor 90. Thereafter, to maintain the synchronization of PN sequence and the received baseband signals, the early signal and late signal, which are earlier and later than the on-time signal by the predetermined number of samples, respectively, are determined based on the on-time signal which is a signal synchronized with the pseudo-noise code.

At this time, if each front end rake receiver, which processes signals through one channel, is normally provided with 4 finger sections. The transmitted signal may be received through a direct path, while it may be received through the multipaths caused by reflection or refraction of the signal. The reason why 4 finger sections are employed is to receive multiple of the transmitted signals through the direct and multipaths, and then to select and combine some of them which have the better energy level among the received signals. Accordingly, the respective finger section separately processes an baseband signal transmitted from one transmitter and the same baseband signals received through another paths.

Thereafter, the early signal, late signal, and on-time signal are respectively inputted to three decimators in each finger section in the baseband signal demodulating apparatus at the point where on-time signal is synchronized with pseudo-noise code. The respective decimator selects one sample which is synchronized with pseudo-noise sequence among the oversampled signals for a predetermined period. Correlators are connected to respective decimeters one to one receiving early, late, and on-time samples, and correlation values between the output signals of the decimators and the pseudo-noise codes are respectively obtained. The correlation values are accumulated by accumulators connected to the correlators, respectively, for a predetermined period. The accumulated signals are transmitted to a symbol processor for further processing such maximum, deinterleaving, time tracking, decoding, and so on.

According to the conventional apparatus performing the above-described operations, correlators and accumulators, the number of which is the same as that of the decimators, should be provided to process multichannel signals received through the multipaths having the same contents, and the early, late, and on-time signals determined from the signal received through a path of a channel, respectively. Specifically, three correlators and three accumulators as well as a pseudo-noise code generator should be provided for each finger section, thereby complicating the construction of the whole baseband signal demodulating apparatus.

Accordingly, if the symbol processor has the same performance and the number of channels is continually increased due to the increase of the subscribers, the number of pseudo-noise code generators, correlators, and accumulators becomes increased as many as the number of channels. As a result, in order to increase the capacity of the conventional CDMA baseband demodulating apparatus, the hardware size of the base station system and the system construction cost should be greatly increased.

SUMMARY OF THE INVENTION

Accordingly, the present invention is directed to a baseband signal demodulating apparatus and method in a mobile radio communication system that substantially obviates one or more of the problems due to limitations and disadvantages of the related art.

An object of the present invention is to provide a baseband signal demodulating apparatus and method in a mobile radio communication system which can minimize the hardware size of the system due to the increase of channels by minimizing the number of correlators, accumulators, and pseudo-noise code generators and by sharing them by a time division multiplexing method.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the baseband signal demodulating apparatus in a mobile radio communication system comprises a plurality of front end rake receivers for demodulating oversampled baseband signals to restore the original signal, transmitting means for sharing demodulated signals from the front end rake receivers by a time division multiplexing method, and despreding means for despreding output signals of the transmitting means.

In another aspect of the present invention, there is provided a baseband signal demodulating method in a mobile radio communication system comprising the steps of demodulating oversampled baseband signals to restore the original signal, transmitting demodulated signals by a time division multiplexing method, and obtaining correlation values of transmitted signals by despreding the transmitted signals.

It is to be understood that both the foregoing general description and the following detailed description are explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Figure 1:
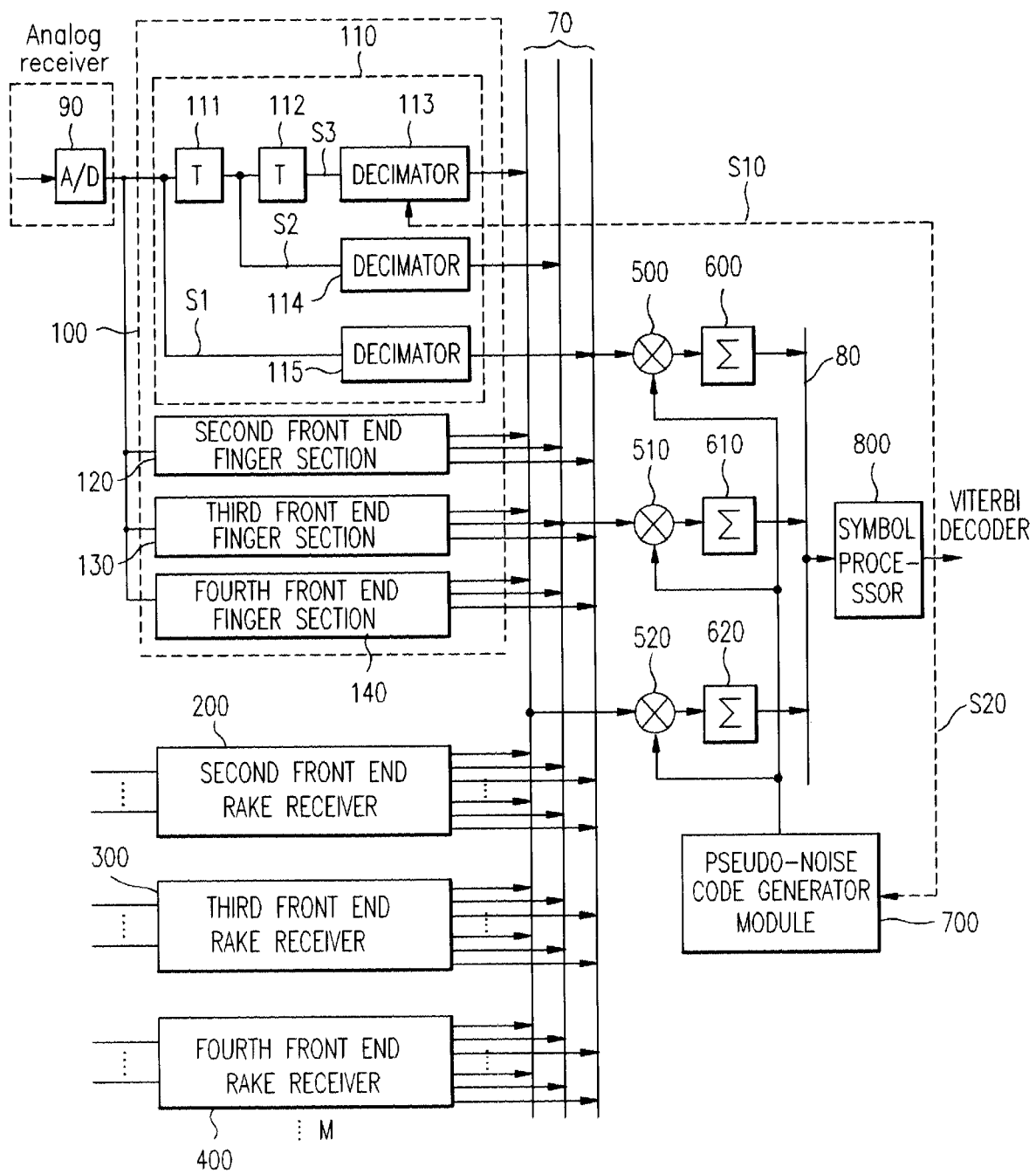
FIG. 1 is a block diagram illustrating the construction of the baseband signal demodulating apparatus in a mobile radio communication system according to the present invention.

Reference will now be made in detail to the preferred embodiments of the present invention, examples of which are illustrated in the accompanying drawings. FIG. 1 is a block diagram illustrating the construction of the baseband signal demodulating apparatus in a mobile radio communication system according to the present invention.

Referring to FIG. 1, the baseband signal demodulating apparatus according to the present invention includes an analog-to-digital (A/D) converter 90 of an analogue receiver for converting an analog RF audio signal transmitted from a mobile unit into a digital baseband signal and repeatedly oversampling the digital signal for a predetermined period, a plurality of front end rake receivers 100~400 for determining an on-time signal S2 which is a reference signal among oversampled signals outputted from the A/D converter 90, producing an early signal S3 and a late signal S1, which are respectively earlier and later than the on-time signal for the predetermined number of sampling signals, and separately processing a baseband signals through a multipath, a dedicated bus 70 for transmitting the on-time signal S2, early signal S3, and late signal S1 outputted from the front end rake receivers 100~400 through predetermined paths in accordance with the corresponding signals outputted from the front end rake receivers, a pseudo-noise code generator module 700 for generating pseudo-noise codes which are different from one another in accordance with users of mobile units, three correlators 500, 510, 520 for respectively demodulating the on-time signal S2, early signal S3, and late signal S1 outputted from the front end rake receiver 100 using the pseudo-noise codes generated from the pseudo-noise code generator module 700 to restore the original baseband signal, three accumulators 600, 610, 620 for respectively accumulating output signals of the correlators 500, 510, 520 for a predetermined period, and a symbol processor 800 for further processing of the signals outputted from the accumulators 600, 610, and 620 to a following viterbi decoder (not illustrated) and transmitting the control signals to the front end rake receivers 100~400 and to the pseudo-noise code generator module 700, respectively, for time tracking.

Here, each of the front end rake receivers 100~400 comprises 4 front end finger sections 110~140, the number of which can be increased on condition that a technical support is applied thereto. Each front end finger section, as shown in FIG. 1, includes two delays 111 and 112, connected together in series, for producing the on-time signal S2, early signal S3, and late signal S1, using the oversampled signals inputted thereto, and three decimators 113, 114, 115 for selecting one of the oversampled signals with respect to the on-time signal S2, early signal S3, and late signal S1.

Figure 2:
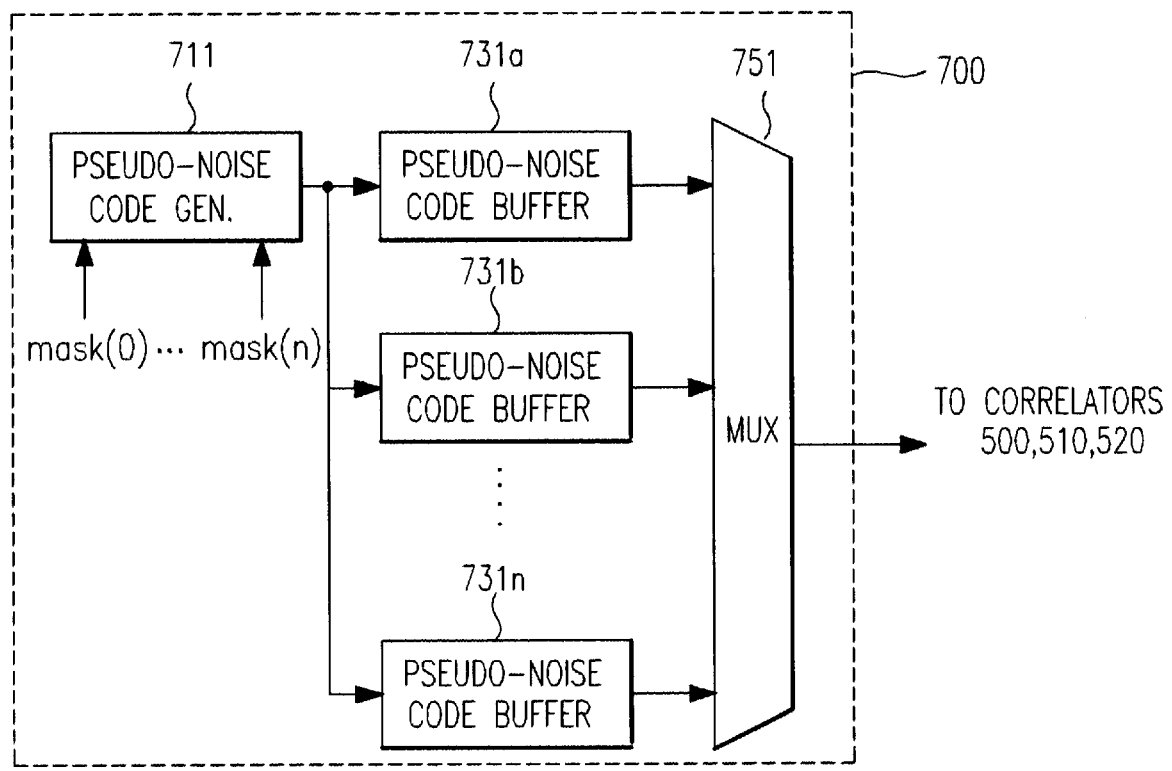
FIG. 2 is a block diagram illustrating the construction of the pseudo-noise code generator module in FIG. 1.

Also, the pseudo-noise code generator module 700, as shown in FIG. 2, includes a pseudo-noise code generator 711, a plurality of pseudo-noise code buffers 731 and 732 for respectively storing a masked PN code produced utilizing the pseudo-noise code outputted from the pseudo-noise code generator 711 and code mask, and a multiplexer 751 for selectively outputting the masked PN code stored in the pseudo-noise code buffers 731 and 732 when it is needed to do so.

Referring again to FIG. 1, the RF signal transmitted from a certain mobile unit is inputted to the A/D converter 90 and is converted into a digital baseband signal. The digital audio signal is then oversampled 8 times per bit in A/D converter (90) of the analog receiver. Here, the number of oversampling times may be varied according to the design condition of the system.

The oversampled signal from the A/D converter 90 is then processed in the respective front end rake receiver. However, according to the preferred embodiment of the present invention, the operation of only one front end rake receiver 100 is explained.

The oversampled signal of the digital baseband signal inputted to the front end rake receiver 100 is then inputted to the decimator 115 as the late signal S1. Simultaneously, the oversampled signal passes through the first delay 111 used for tracking the CDMA signal, and then inputted to the decimator 114 as the on-time signal S2. At the same time, the oversampled signal passes through the first delay ill and the second delay 112 in turn, and then inputted to the decimator 113 as the early signal S3. Specifically, the signals inputted to the respective decimators 113~115 are defined as the early signal S3 and late signal S1 which are earlier and later than the on-time signal S2, which is synchronized with the pseudo-noise code, for a predetermined number of samples, respectively. The on-time signal S2, early signal S3, and late signal S1 are respectively converted into the signals having their original period determined before being oversampled by the respective decimators 500, 510, and 520 at the time point when on-time signal is synchronized with the pseudo-noise code. The respective front end finger section 110–140 provided in the front end rake receiver transmits the on-time signal S2, early signal S3, and late signal S1 to the correlators 500, 510, and 520 through dedicated bus lines 76 which are classified according to the kinds of the signals, i.e., the on-time signal, early signal, and late signal. At this time, the respective front end finger section 110–140 transmits the on-time signal S2, early signals S3, and late signals S3, and thus the system can produce the on-time signals S2, early signals S3, and late signals S3, the number of which corresponds to the number of the whole front end finger sections.

Here, the dedicated bus lines 70 are shared by the time division multiplexing method having a period determined corresponding to the number of the whole front end finger sections. In other words, the signals outputted from the whole front end finger sections are processed in parallel by dividing the use period of the dedicated bus lines 70 into the number of the decimators which process the whole on-time signals S2, early signals S3, and late signals S3.

Accordingly, a pseudo-noise code buffers 731a–731n, which receive the pseudo-noise codes from the pseudo-noise code generator 711, transfer the masked PN codes which correspond to the respective front end rake receivers to the correlators 500, 510, and 520 through the multiplexer 751, thereby obtaining the correlation values. The correlation values outputted from the correlators 500, 510, and 520 are inputted to the accumulators 600, 610, and 620 to be accumulated for the predetermined period. Thereafter, output signals of the respective accumulators 600, 610, and 620 are transmitted to the symbol processor 800 through the bus 80.

The symbol processor 800 performs combining, time tracking, and so on with signals provided from the respective accumulators 600, 610, and 620 to the following viterbi decoder to perform the decoding process, and transmits control signals and late signals to the respective front end finger sections and the pseudo-noise code generator module 700 to compensate for the synchronization error.

As described above, according to the present invention, the physical size of the base station receiver can be greatly reduced. This effect may not show if the number of channel is very small, but it will become great if the number of channel is very large. Also, since a plurality of front end rake receivers can receive the necessary pseudo-noise codes from three correlators, three accumulators, a pseudo-noise code generator and pseudo-noise code buffers which are storage elements in the unit of a bit, the time required for synchronization can be reduced when a new input signal is allocated to the respective front end rake receivers.

It will be apparent to those skilled in the art that various modifications and variations can be made in the baseband signal demodulating apparatus and method in a mobile radio communication system of the present invention without departing from the spirit and scope of the invention. Thus, it is intended that the present invention covers the modifications and variations of this invention provided they come within the scope of the appended claims and their equivalents.

What is claimed is:

1. A baseband signal demodulating apparatus in a mobile radio communication system comprising:

a plurality of front end rake receivers configured to demodulate oversampled baseband signals to restore an original signal;

transmitting means coupled to receive and output demodulated signals from the plurality of front end rake receivers by a time division multiplexing method; and a despreader coupled to receive and despread output signals of the transmitter.

2. The baseband signal demodulating apparatus of claim 1, wherein each of the front end rake receivers comprises a plurality of front end finger sections for processing signals received through a single path using the input baseband signal.

3. The baseband signal demodulating apparatus of claim 2, wherein each of the front end finger sections comprises:

at least one delay for producing a plurality of signals by delaying the baseband signal; and at least one decimator for selecting and outputting to the transmitting means one reference signal from the plurality of signals outputted from the delay.

4. The baseband signal demodulating apparatus of claim 3, wherein each of the front end take receivers comprises a plurality of front end finger sections.

5. The baseband signal demodulating apparatus of claim 4, wherein the transmitting means comprises a plurality of buses for transmitting signals from the at least one decimator of each of the front end finger sections to the despreader through different paths.

6. The baseband signal demodulating apparatus of claim 5, wherein each bus of the plurality of buses is connected to signals of each of the decimators having the same characteristic as output signals of the decimator.

7. The baseband signal demodulating apparatus of claim 1, wherein the despreader comprises:

a correlation module for obtaining correlation values from the signals transmitted through the transmitting means;

a pseudo-noise code generator module for providing a reference signal to the correlation module; and a symbol processor for outputting control signals to the plurality of front end rake receivers and to the pseudo-noise code generator module, respectively, for time tracking.

8. The baseband signal demodulating apparatus of claim 7, wherein the correlation module comprises:

a plurality of correlators for obtaining the correlation values in accordance with the signals from the transmitting means and the signals from the pseudo-noise code generator module; and a plurality of accumulators for accumulating output signals of the correlators for a predetermined time.

9. The baseband signal demodulating apparatus of claim 8, wherein each of the front-end RAKE receivers comprises at least one decimator.

10. The baseband signal demodulating apparatus of claim 8, wherein each one of the front-end RAKE receivers comprises a plurality of front end finger sections, and wherein each one of the front end finger sections comprises a plurality of decimators.

11. The baseband signal demodulating apparatus of claim 10, wherein a number of correlators and a number of accumulators is the same as a number of decimators in each one of the plurality of front end finger sections.

12. The baseband signal demodulating apparatus of claim 7, wherein the pseudo-noise code generator module comprises:

at least one pseudo-noise code generator coupled to receive plurality of code masks, and configure to generate pseudo-noise (PN) codes and output masked PN codes;

a plurality of buffers for respectively storing the masked PN codes outputted from the at least one pseudo-noise code generator; and a multiplexer for selectively outputting the masked PN codes stored in the buffers if it is needed to do so.

13. The baseband signal demodulating apparatus of claim 1, wherein the plurality of front-end RAKE receivers each comprises a plurality of decimators, and wherein the despreader comprises a plurality of correlators and accumulators, wherein a number of correlators of the despreader is equal to a number of accumulators of the despreader, and wherein a total number of decimators for the plurality of front-end RAKE receivers is greater than the number of correlators and despreaders.

14. The baseband signal demodulating apparatus of claim 13, wherein a PN code is provided to each of the correlators using a single PN code generator module.

15. The baseband signal the modulating apparatus of claim 1, wherein a number of correlators and accumulators of the despreader is less than a number of decimators in the plurality of front end RAKE receivers.

16. The baseband signal demodulating apparatus of claim 1, wherein the transmitting means comprises a plurality of buses configured to transmit a plurality of signals from the plurality of front end RAKE receivers to the despreader.

17. A baseband signal demodulating method in a mobile radio communication system, comprising:

demodulating oversampled baseband signals to restore original signals using at least one front-end RAKE receiver having a first prescribed number of decimators;

transmitting the demodulated original signals by a time division multiplexing method from the front-end RAKE receiver to a despreader; and obtaining correlation values of transmitted signals by despreding the transmitted signals using a second prescribed number of despreaders, wherein the first prescribed number is greater than the second prescribed number.

18. The baseband signal demodulating method of claim 17, wherein demodulating comprises:

sampling a plurality of signals by delaying the over-sampled baseband signals through delays; and inputting at least one signal selected at the sampling step to corresponding decimators.

19. The baseband signal demodulating method of claim 18, wherein at the sampling step, an on-time signal is determined, and an early signal and a late signal, which are relatively earlier and later than the on-time signal, respectively, are produced.

20. The baseband signal demodulating method of claim 19, wherein the early signal and late signal are used performing time delay for synchronization.

21. The baseband signal demodulating method of claim 17, wherein at the signal transmitting step, respective demodulated original signals are transmitted through a plurality of buses corresponding prescribed ones of the demodulated original signals.

22. The baseband signal demodulating method of claim 10, wherein despreding the transmitted signals comprises:

obtaining the correlation values in accordance with the respective transmitted signals and signals from a pseudo-noise code generator module; and outputting control signals to decimators and the pseudo-noise code generator module for time tracking.

23. The baseband signal demodulating method of claim 22, wherein the pseudo-noise code generator module generates pseudo-noise codes utilizing PN codes masks allocated to respective mobile units.

24. The baseband signal demodulating method of claim 17, wherein correlation values of an on-time signal, an early signal, and a late signal are obtained utilizing pseudo-noise codes.

25. The baseband signal demodulating method of claim 17, further comprising accumulating an early signal and a late signal obtained at the demodulating step for a predetermined period of time.

26. A baseband signal demodulating apparatus in a mobile communication system, comprising:

a plurality of front-end RAKE receivers for decimating over-sample baseband signals;

transmission means for sharing decimated signals by a time division multiplexing method; and a despreader for despreading output signals of the transmission means using a code generator.

27. The baseband signal demodulating apparatus of claim 26, wherein each one of the front-end RAKE receivers comprises a plurality of front end finger sections, and wherein each one of the front end finger sections comprises a plurality of decimators.

28. The baseband signal demodulating apparatus of claim 27, wherein a number of correlators and a number of accumulators is the same as a number of decimators in each one of the plurality of front end finger sections.

29. The baseband signal demodulating apparatus of claim 28, wherein the transmitting means comprises a plurality of buses configured to transmit a plurality of signals from corresponding decimators of each front end finger section to the despreader, wherein a number of buses is equal to the number of decimators in each one of the plurality of front end finger sections.

30. A baseband signal demodulating method in a mobile radio communication system, comprising:

converting and over-sampling a baseband signal to a digital signal;

producing early time signals, late time signals, and on-time signals from the over-sampled digital signal in a plurality of front end finger sections of a RAKE receiver;

decimating the early time signals, the late time signals, and the on-time signals to operate at a prescribed rate and timing;

transmitting the decimated early signals, the decimated late signals, and the decimated on-time signals using a time division multiplexing method; and despreading the transmitted signals by PN codes generated from one PN code generator.

* * * * *